United States Patent
Parron et al.

(10) Patent No.: US 11,375,558 B2
(45) Date of Patent: Jun. 28, 2022

(54) LWIP (LTE/WLAN RADIO LEVEL INTEGRATION USING IPSEC TUNNEL) PACKET ACKNOWLEDGEMENT USING GRE (GENERIC ROUTING ENCAPSULATION) HEADER

(71) Applicant: Apple Inc., Cupertino, CA (US)

(72) Inventors: Jerome Parron, Fuerth (DE); Alexander Sirotkin, Petach Tikva (RU)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 16/976,969

(22) PCT Filed: Nov. 16, 2017

(86) PCT No.: PCT/US2017/061936
§ 371 (c)(1),
(2) Date: Aug. 31, 2020

(87) PCT Pub. No.: WO2018/102138
PCT Pub. Date: Jun. 7, 2018

(65) Prior Publication Data
US 2021/0410212 A1    Dec. 30, 2021

Related U.S. Application Data

(60) Provisional application No. 62/429,515, filed on Dec. 2, 2016.

(51) Int. Cl.
*H04W 76/12* (2018.01)
*H04L 1/16* (2006.01)
(Continued)

(52) U.S. Cl.
CPC .......... *H04W 76/12* (2018.02); *H04L 1/1642* (2013.01); *H04L 1/1896* (2013.01);
(Continued)

(58) Field of Classification Search
CPC .... H04W 76/12; H04W 84/12; H04L 1/1642; H04L 1/1896; H04L 12/4633; H04L 63/164
See application file for complete search history.

(56) References Cited

U.S. PATENT DOCUMENTS

| 6,621,799 B1 * | 9/2003 | Kemp | H04L 1/1809 |
| | | | 370/236 |
| 2015/0131449 A1 * | 5/2015 | Kojima | H04B 7/15521 |
| | | | 370/236 |

(Continued)

OTHER PUBLICATIONS

International Search Report dated Feb. 13, 2018 for International Application No. PCT/US2017/061936.

(Continued)

*Primary Examiner* — Saad A. Waqas
(74) *Attorney, Agent, or Firm* — Eschweiler & Potashnik, LLC

(57) ABSTRACT

Techniques discussed herein can facilitate acknowledgment and/or re-ordering of LWIPEP (LWIP (LTE (Long Term Evolution)/WLAN (Wireless Local Area Network) Radio Level Integration Using IPSec (Internet Protocol Security) Tunnel) Encapsulation Protocol) packets. In various aspects employing a LWIP acknowledgment mode, LWIPEP packets can comprise an enhanced GRE (Generic Routing Encapsulation) header comprising a SN (Sequence Number) of the payload of that LWIPEP packet, which can facilitate acknowledgment of LWIPEP packets and re-ordering of LWIPEP packets (e.g., communicated over a WLAN link, an LTE link, or both) based on the SN(s) indicated in the enhanced GRE header(s).

28 Claims, 11 Drawing Sheets

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|R|K|S|s|Recur|A| Flags | Ver |         Protocol Type         |
+-+-+-+-+-+-+-+-+-+-+-+-+-+-+-+-+-+-+-+-+-+-+-+-+-+-+-+-+-+-+-+-+
|     Key (HW) Payload Length   |       Key (LW) Call ID        |
+-+-+-+-+-+-+-+-+-+-+-+-+-+-+-+-+-+-+-+-+-+-+-+-+-+-+-+-+-+-+-+-+
|                   Sequence Number (Optional)                  |
+-+-+-+-+-+-+-+-+-+-+-+-+-+-+-+-+-+-+-+-+-+-+-+-+-+-+-+-+-+-+-+-+
|                 Acknowledgment Number (Optional)              |
+-+-+-+-+-+-+-+-+-+-+-+-+-+-+-+-+-+-+-+-+-+-+-+-+-+-+-+-+-+-+-+-+
```

(51) Int. Cl.
*H04L 1/18* (2006.01)
*H04L 12/46* (2006.01)
*H04L 9/40* (2022.01)
*H04W 84/12* (2009.01)

(52) U.S. Cl.
CPC ........ *H04L 12/4633* (2013.01); *H04L 63/164* (2013.01); *H04W 84/12* (2013.01)

(56) References Cited

U.S. PATENT DOCUMENTS

| | | | |
|---|---|---|---|
| 2016/0029426 A1 | 1/2016 | Bangolae et al. | |
| 2016/0119939 A1* | 4/2016 | Himayat | H04W 76/11 370/329 |
| 2016/0128110 A1 | 5/2016 | Sirotkin et al. | |
| 2016/0191380 A1 | 6/2016 | De et al. | |
| 2016/0234752 A1 | 8/2016 | Hsu et al. | |
| 2016/0323782 A1* | 11/2016 | Baillargeon | H04L 12/4633 |
| 2016/0337485 A1* | 11/2016 | Nuggehalli | H04L 69/22 |
| 2016/0380884 A1* | 12/2016 | Sarikaya | H04W 8/08 370/389 |
| 2017/0111826 A1* | 4/2017 | Sankar | H04W 72/0413 |
| 2019/0364420 A1* | 11/2019 | Rommer | H04L 63/08 |
| 2020/0305218 A1* | 9/2020 | Zhu | H04W 28/04 |

OTHER PUBLICATIONS

International Preliminary Report on Patentability dated Jun. 4, 2019 for International Application No. PCT/US2017/061936.
Hamzeh, et al.; "Point-to-Point Tunneling Protocol (PPTP)", Network Working Group Request for comments: 2637; Category: Informational; The Internet Society (1999); p. 1-57.
3GPP TS 36/361 V14/0/0 (Dec. 2016); 3rd Generation Partnership Project; Technical Specification Group Radio Access Network; Evolved Universal Terrestrial Radio Access (E-UTRA); LTE/WLAN Radio Level Integration Using IPsec Tunnel (LWIP) Encapsulation; Protocol Specification (Release 14); Dec. 2016; p. 1-76.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|R|K|S|s|Recur|A| Flags | Ver |        Protocol Type          |
+-+-+-+-+-+-+-+-+-+-+-+-+-+-+-+-+-+-+-+-+-+-+-+-+-+-+-+-+-+-+-+-+
|     Key (HW) Payload Length   |      Key (LW) Call ID         |
+-+-+-+-+-+-+-+-+-+-+-+-+-+-+-+-+-+-+-+-+-+-+-+-+-+-+-+-+-+-+-+-+
|                   Sequence Number (Optional)                  |
+-+-+-+-+-+-+-+-+-+-+-+-+-+-+-+-+-+-+-+-+-+-+-+-+-+-+-+-+-+-+-+-+
|                Acknowledgment Number (Optional)               |
+-+-+-+-+-+-+-+-+-+-+-+-+-+-+-+-+-+-+-+-+-+-+-+-+-+-+-+-+-+-+-+-+
```

FIG. 7

LWIP (LTE/WLAN RADIO LEVEL INTEGRATION USING IPSEC TUNNEL) PACKET ACKNOWLEDGEMENT USING GRE (GENERIC ROUTING ENCAPSULATION) HEADER

REFERENCE TO RELATED APPLICATIONS

This application is a National Phase entry application of International Patent Application No. PCT/US2017/061936 filed Nov. 16, 2017, which claims priority to U.S. Provisional Patent Application No. 62/429,515 filed Dec. 2, 2016, entitled "LEVEL INTEGRATION USING IPSEC (LWIP) PACKET ACKNOWLEDGEMENT USING GENERIC ROUTING ENCAPSULATION (GRE) HEADER", the contents of which are herein incorporated by reference in their entirety.

FIELD

The present disclosure relates to wireless technology, and more specifically to techniques for employing GRE (Generic Routing Encapsulation) headers in connection with LWIP (LTE (Long Term Evolution)/WLAN (Wireless Local Area Network) radio level integration using IPSec (Internet Protocol Security) tunnel).

BACKGROUND

With LWIP (LTE (Long Term Evolution)/WLAN (Wireless Local Area Network) Radio Level Integration Using IPsec (IP (Internet Protocol) Security) Tunnel), the BS (TRP (Transmit/Receive Point) such as a Base Station, e.g., eNB (Evolved NodeB), gNB (next Generation NodeB), etc.) has no information on the supported throughput on the IPSec tunnel/WLAN link, consequently it can potentially overflow the link especially if there is some congestion on WLAN. This can lead to packet(s) being dropped, leading to throughput degradation.

BRIEF DESCRIPTION OF THE DRAWINGS

FIG. 7 is a diagram illustrating an enhanced GRE header (with the optional fields "Sequence Number" and "Acknowledge Number" emphasized, along with their respective flags) that can be employed in various aspects discussed herein.

DETAILED DESCRIPTION

Figure 1:
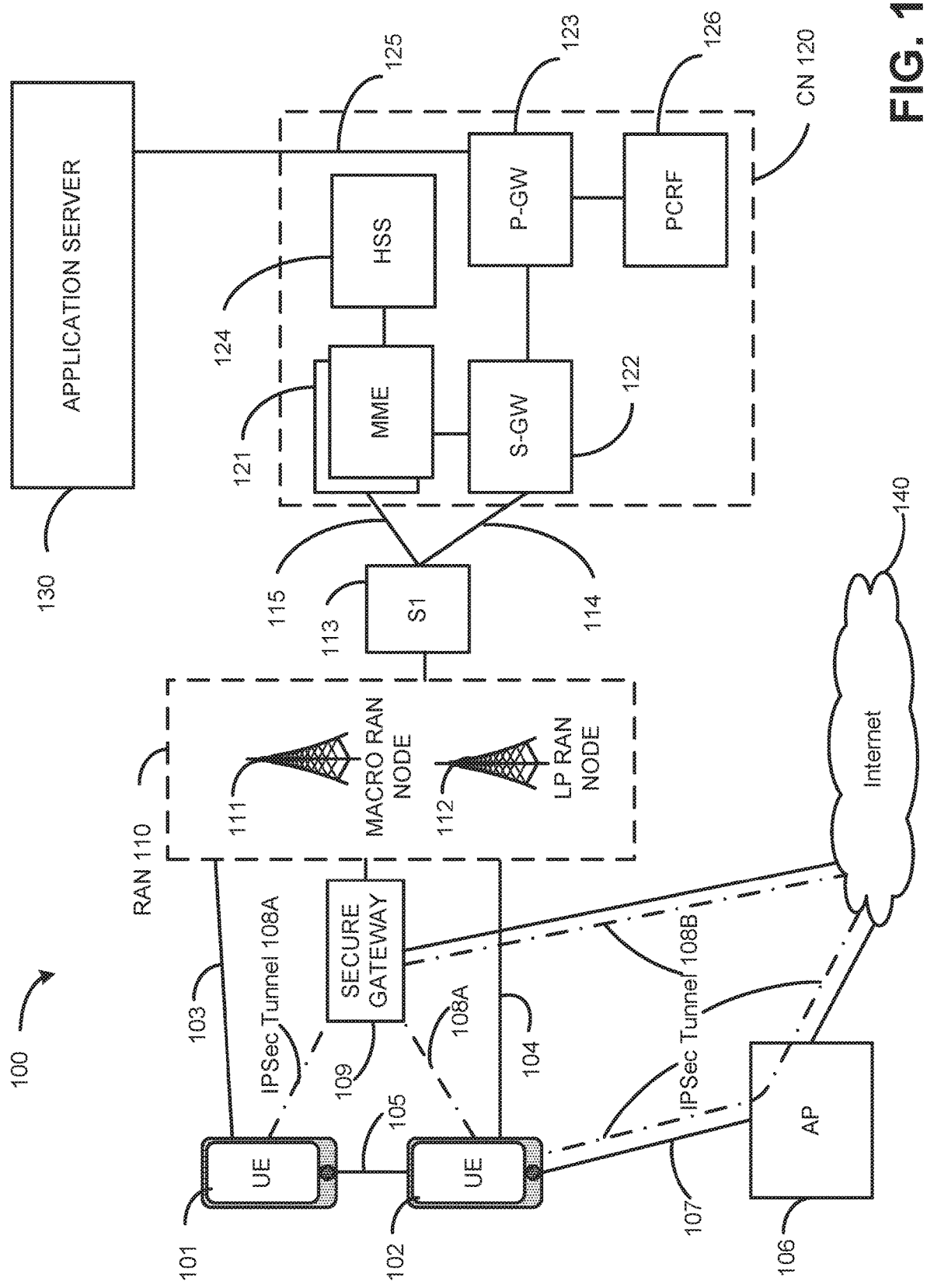
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like. In aspects, UEs 101 and 102 can be connected to a BS (Base Station, e.g., eNB, gNB, etc.) of RAN 110 via secure gateway 109 by way of IPSec tunnel 108A connecting UEs 101 and/or 102 to the BS via air interface 103 and/or 104 and/or by way of IPSec tunnel 108B connecting UEs 101 and/or 102 to the BS via AP 106 (over connection 107) through the Internet 140.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet 140 without directly connecting to the core network of the wireless system (described in further detail below). The UE (e.g., 102 and/or 103), once associated with the AP 106, can create a Virtual Private Network (VPN) to reach the BS via the AP 106.

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
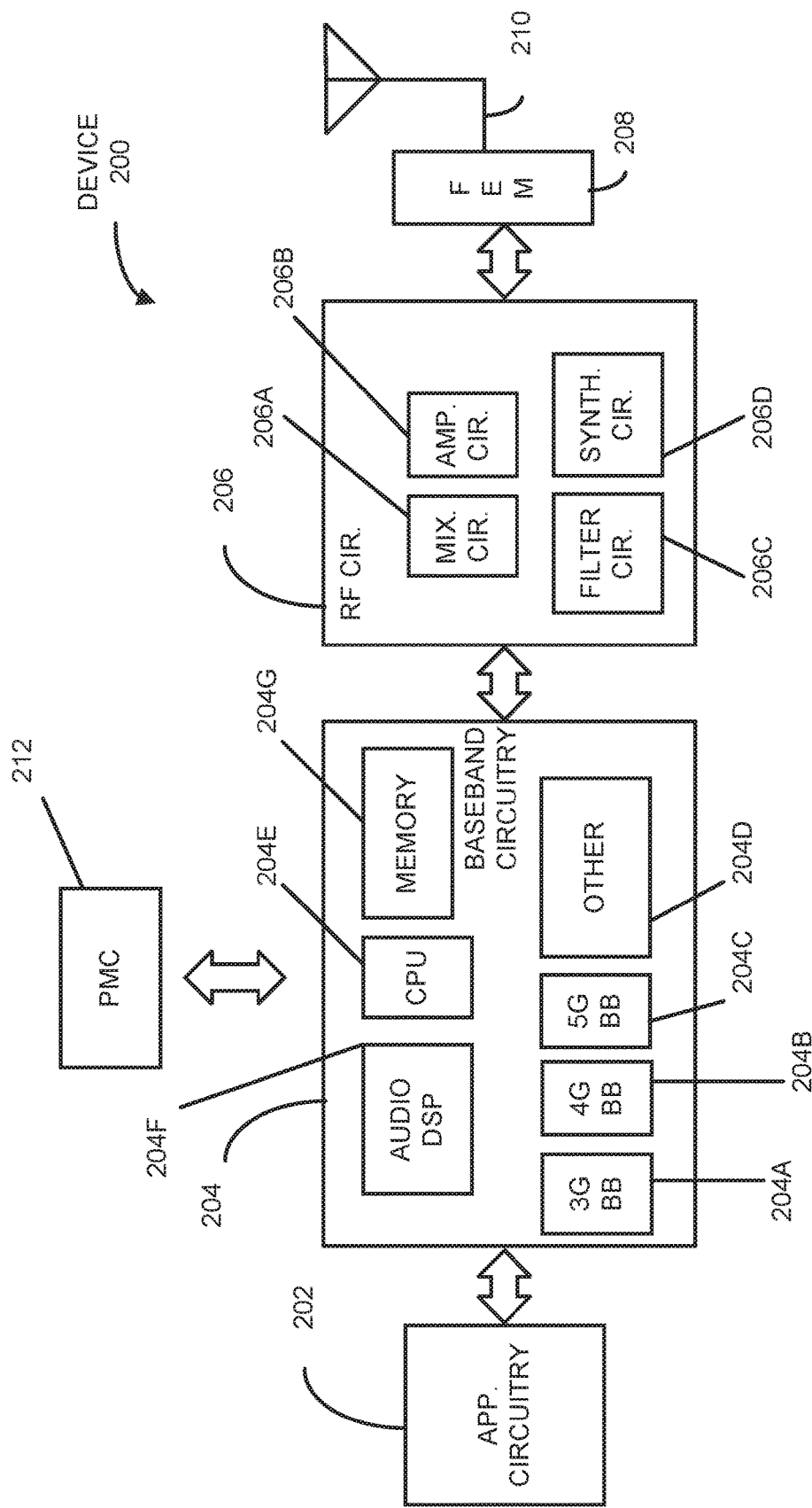
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206*a*, amplifier circuitry 206*b* and filter circuitry 206*c*. In some embodiments, the transmit signal path of the RF circuitry 206 may include filter circuitry 206*c* and mixer circuitry 206*a*. RF circuitry 206 may also include synthesizer circuitry 206*d* for synthesizing a frequency for use by the mixer circuitry 206*a* of the receive signal path and the transmit signal path. In some embodiments, the mixer circuitry 206*a* of the receive signal path may be configured to down-convert RF signals received from the FEM circuitry 208 based on the synthesized frequency provided by synthesizer circuitry 206*d*. The amplifier circuitry 206*b* may be configured to amplify the down-converted signals and the filter circuitry 206*c* may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
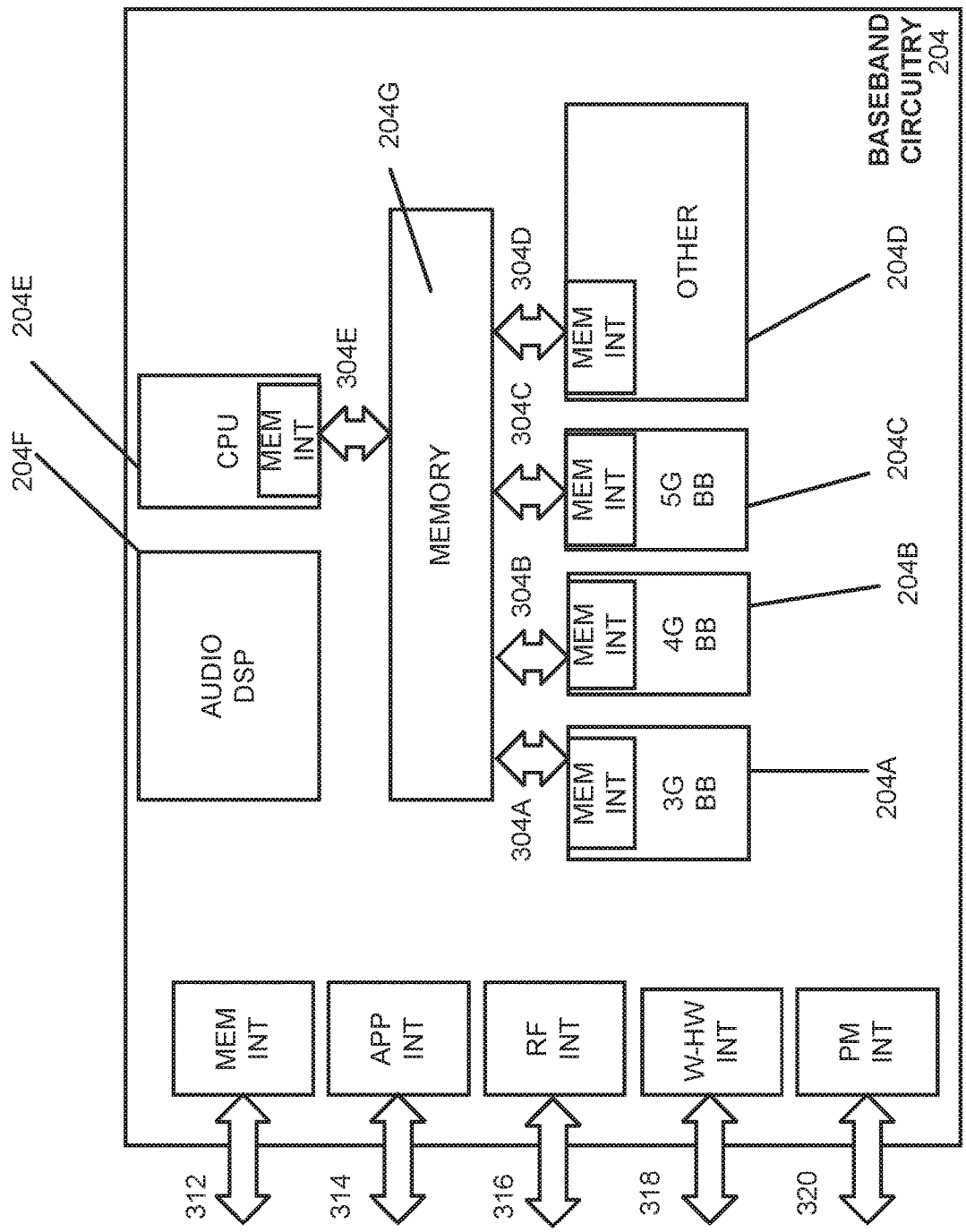
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
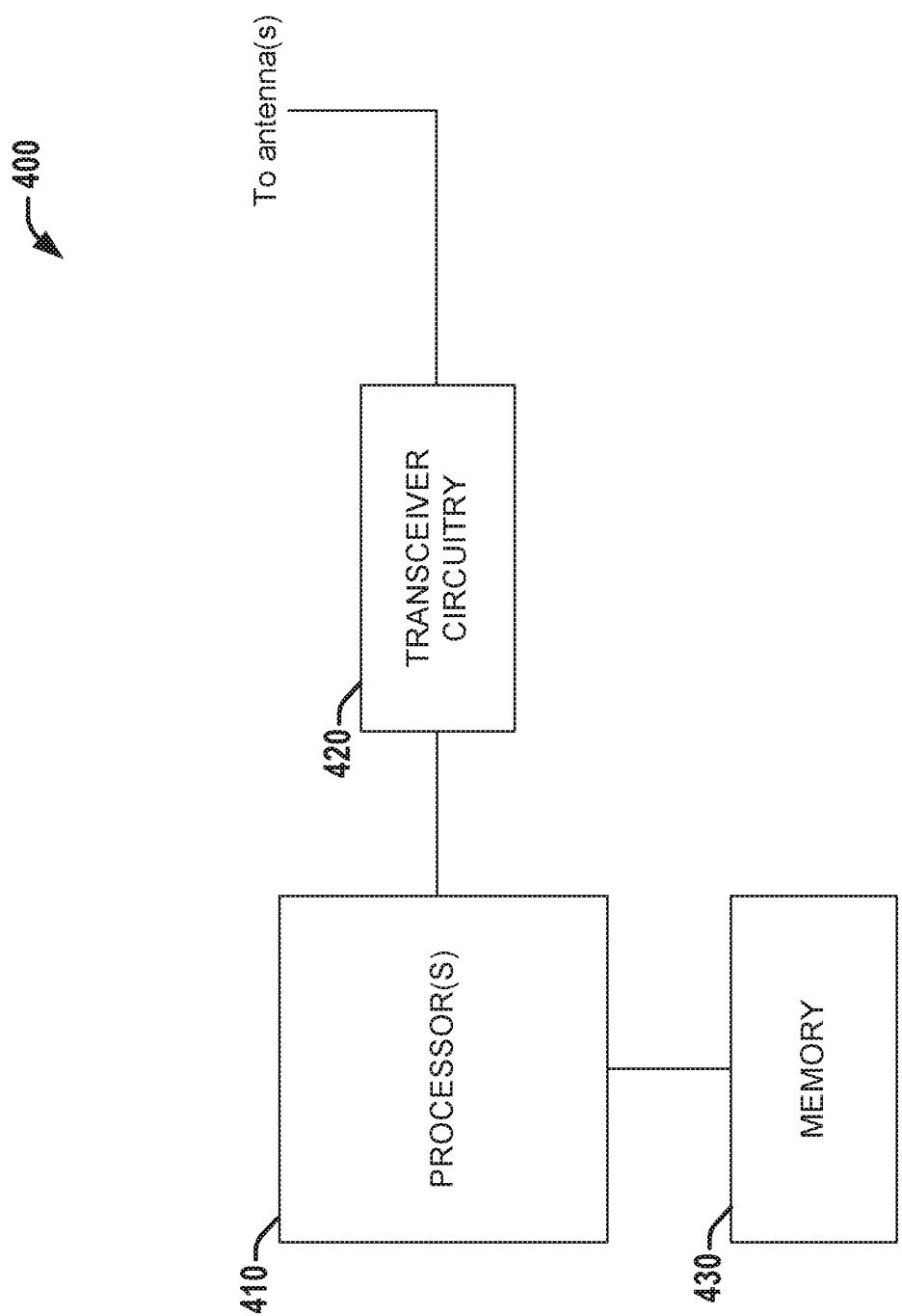
FIG. 4 is a block diagram illustrating a system employable at a UE (User Equipment) that facilitates communication via a LWIP (LTE (Long Term Evolution)/WLAN (Wireless Local Area Network) Radio Level Integration Using IPsec (IP (Internet Protocol) Security) Tunnel) bearer employing SN(s) (Sequence Number(s)) and an acknowledgment mechanism, according to various aspects described herein.

Referring to FIG. 4, illustrated is a block diagram of a system 400 employable at a UE (User Equipment) that facilitates communication via a LWIP bearer employing SN(s) (Sequence Number(s)) and an acknowledgment mechanism, according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate transmission and reception of LWIPEP (LWIP Encapsulation Protocol)) packets with associated SNs that can facilitate acknowledgment and/or re-ordering.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
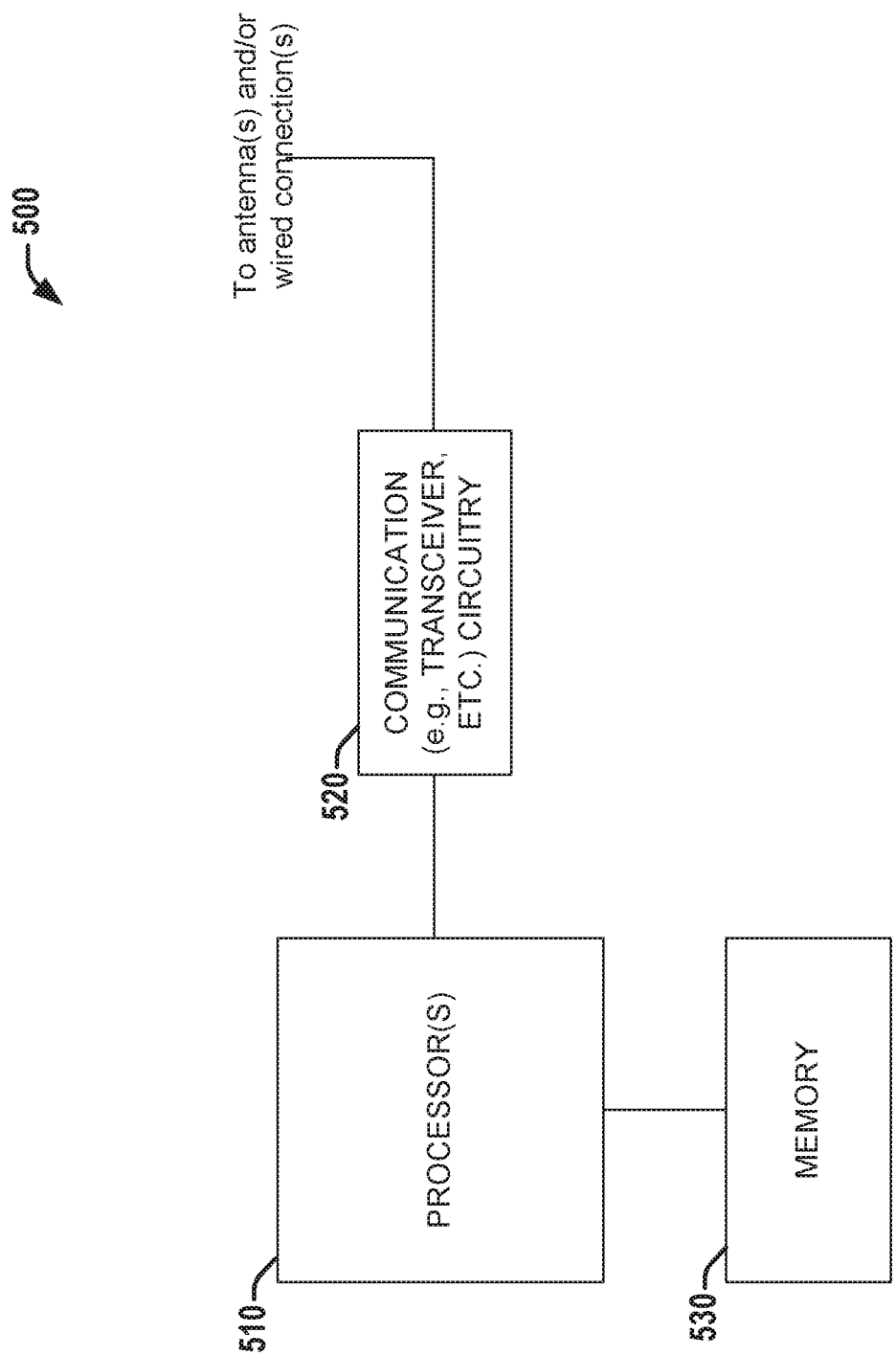
FIG. 5 is a block diagram illustrating a system employable at a BS (Base Station) that facilitates communication via a LWIP bearer employing SN(s) and an acknowledgment mechanism, according to various aspects described herein.

Referring to FIG. 5, illustrated is a block diagram of a system 500 employable at a BS (Base Station) that facilitates communication via a LWIP bearer employing SN(s) (Sequence Number(s)) and an acknowledgment mechanism, according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate transmission and reception of LWIPEP (LWIP Encapsulation Protocol)) packets with associated SNs that can facilitate acknowledgment and/or re-ordering, and associated configuration of a UE.

Discussions of LWIP (LTE (Long Term Evolution)/WLAN (Wireless Local Area Network) Radio Level Integration Using IPsec (IP (Internet Protocol) Security) Tunnel) have focused on solutions without UE impact, that is, the Secure Gateway (SeGW) can provide feedback to the BS (e.g., eNB, etc.) on the possible throughput. However, it can be difficult for the SeGW to estimate the throughput, given that it is handling a secure IP connection and IP protocol does not provide acknowledgment. The UE where the IPSec tunnel ends does not send feedback to the SeGW on the received packet.

An additional issue with LWIP which can be solved via techniques discussed herein is lack of re-ordering for LWIP. In various aspects discussed herein, Generic Routing Encapsulation (GRE) headers can be employed on both the LTE and WLAN links, and the receiving UE (e.g., comprising system 400) can use GRE sequence numbers for re-ordering (e.g., via processor(s) 410).

In various aspects, a GRE tunnel can be employed for LWIP (e.g., by system 400 and system 500) to provide sequence number(s) and an acknowledgment mechanism, and to notify the transmitting entity (e.g., BS, UE, etc.) whether the data has been well received by the receiving UE or BS (e.g., via an acknowledgment generated by processor(s) 410 (or processor(s) 510, respectively), transmitted via transceiver circuitry 420 (or communication circuitry 520, respectively), received via communication circuitry 520 (or transceiver circuitry 420, respectively), and processed by processor(s) 410 (or processor(s) 510, respectively)). The transmitting entity (e.g., BS, UE, etc.) can then estimate (e.g., via processor(s) 510 or processor(s) 410) the average throughput of the link and can optionally detect (e.g., via processor(s) 510 or processor(s) 410) packet loss. If GRE header(s) are employed on both the LTE and WLAN links, the receiving entity (e.g., UE or BS) can also re-order packets received from both links (e.g., via processor(s) 410 or processor(s) 510).

In various aspects, the BS can configure the UE (e.g., via configuration signaling generated by processor(s) 510, transmitted via communication circuitry 520, received via transceiver circuitry 420, and processed by processor(s) 410) to use GRE sequence numbering and acknowledgment for the DL (e.g., data/signaling sent from the BS to UE), but not for the UL (e.g., data/signaling sent from the UE to BS). The UE can estimate (e.g., via processor(s) 410) the UL WiFi throughput and implement (e.g., via processor(s) 410) a congestion control mechanism to limit the amount of data sent where appropriate.

In various aspects, the BS can employ techniques discussed herein to determine (e.g., via processor(s) 510) the achievable throughput on an LWIP bearer and can prevent potential overflow of the link (e.g., via processor(s) 510). Additionally, techniques discussed herein can allow for aggregation on both the LTE and WLAN links with LWIP.

Configuration of LWIP Acknowledge Mode

The BS (e.g., gNB, eNB, etc. employing system 500) can notify the UE (e.g., employing system 400) via RRC (Radio Resource Control) signaling (e.g., generated by processor(s) 510, transmitted by communication circuitry 520, received by transceiver circuitry 420, and processed by processor(s) 410) whether LWIP acknowledge mode is enabled or not. In aspects, the LWIP acknowledge mode can be configured independently for Downlink (DL) and/or Uplink (UL).

In some aspects, the LWIP-Configuration IE (information element) in the RRC protocol can be extended to indicate the LWIP acknowledgment mode. In other aspects, a new IE can be defined for this purpose. Alternatively, in various aspects, GRE acknowledged mode can be always enabled for UEs (e.g., Rel-14 (LTE Release 14) UEs) that support LWIP.

If the LWIP acknowledge mode is enabled, the BS (e.g., eNB, gNB, etc.) can also indicate the acknowledgment method (e.g., via higher layer (e.g., RRC) signaling generated by processor(s) 510, transmitted by communication circuitry 520, received by transceiver circuitry 420, and processed by processor(s) 410). The acknowledgment method can be one of: (a) all packets are acknowledged, (b) periodic acknowledgment, or (c) the packets are acknowledged upon poll request only.

Acknowledgment of the LWIPEP Packet

Figure 6:
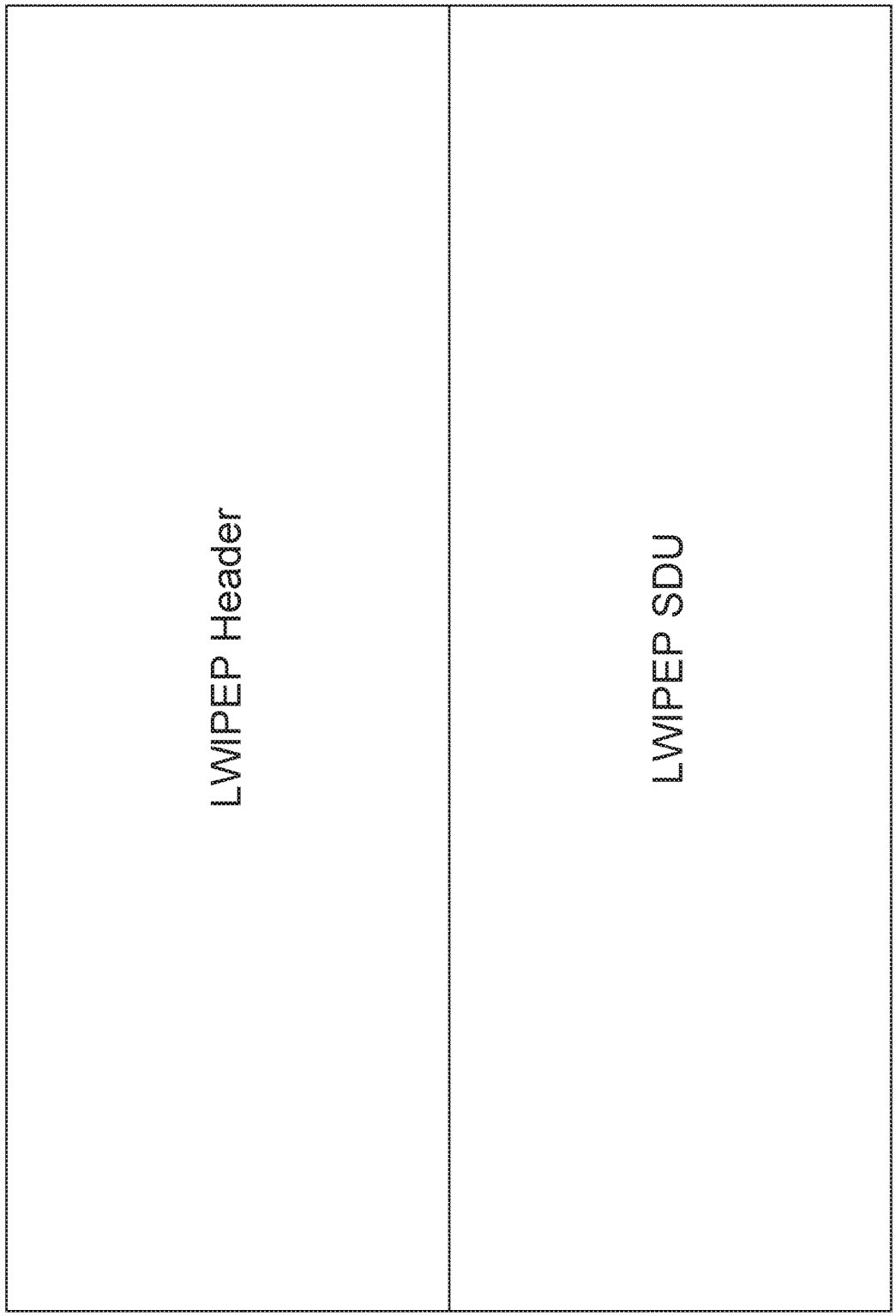
FIG. 6 is a diagram illustrating a LWIPEP (LWIP Encapsulation Protocol) data PDU (Protocol Data Unit), in connection with various aspects discussed herein.

Referring to FIG. 6, illustrated is a diagram showing a LWIPEP (LWIP Encapsulation Protocol) data PDU (Protocol Data Unit), in connection with various aspects discussed herein. The LWIPEP header can be a GRE (Generic Routing Encapsulation) header as defined in 3GPP (Third Generation Partnership Project) TS (Technical Specification) 36.361. In various aspects discussed herein, the LWIP header can be an enhanced GRE header (e.g., as defined in RFC (Request for Comments) 2637 section 4.1).

In aspects, when the LWIP acknowledgment mode is not employed, a legacy GRE header as defined in TS 36.361 Rel-13 can be employed. When the LWIP acknowledgment mode is employed, then the enhanced GRE header with additional optional fields "Sequence Number" and "Acknowledge Number" can be employed. Referring to FIG. 7, illustrated is a diagram of an enhanced GRE header (with the optional fields "Sequence Number" and "Acknowledge Number" emphasized, along with their respective flags) that can be employed in various aspects discussed herein.

As shown in FIG. 7, the enhanced GRE header can comprise the following bits and fields (which can be as discussed below) not present in the legacy GRE header: an S bit, an A bit, an optional Sequence Number, and an optional Acknowledgment Number.

S (Bit 3): Sequence Number Present. Can be set to one (1) if a payload (data) packet is present. Can be set to zero (0) if a payload is not present (e.g., if the GRE packet is an Acknowledgment only).

A (Bit 8): Acknowledgment sequence number present. Can be set to one (1) if the packet contains an Acknowledgment Number to be used for acknowledging previously transmitted data.

Sequence Number: Can contain the sequence number of the payload. Can be present if the S bit (Bit 3) is one (1).

Acknowledgment Number: Can contain the sequence number of the highest numbered GRE packet received by the sending peer for this user session. Can be present if the A bit (Bit 8) is one (1).

The protocol type in the GRE header can be set according to one of the following alternatives: (a) The protocol type can be that used for LWIP release 13 as described in 3GPP TS 36.361; (b) The protocol type can be set to 0x880B (point to point) as defined in RFC 2637 for the usage of extended GRE header, or (c) a new ethertype applicable for LWIP can be created and employed.

Role of the Transmitting Entity (BS or UE)

When LWIP acknowledge mode is enabled, the transmitting entity (e.g., employing system 400 or system 500) can set the S bit to "1" and fill in the sequence number field in the GRE header (e.g., via processor(s) 410 or processor(s) 510). The sequence number can be incremented (e.g., via processor(s) 410 or processor(s) 510) for each new LWIPEP packet sent containing data (e.g., and not for "acknowledge only" packet(s)). When a new session is started, the start sequence number can be set to (e.g., via processor(s) 410 or processor(s) 510) one of Null, a randomly defined value, or a value configured by the BS (e.g., via higher layer (e.g., RRC) signaling generated by processor(s) 510, transmitted by communication circuitry 520, received by transceiver circuitry 420, and processed by processor(s) 410). Additionally, if aggregation is enabled, the transmitting entity can employ LWIPEP packet(s) (e.g., with GRE header) on both the LTE and WLAN links (e.g., via generation by processor(s) 410 or processor(s) 510 and transmission via transceiver circuitry 420 or communication circuitry 520).

Role of the Receiving Entity (UE or BS)

When receiving a LWPEP packet, the receiving entity (e.g., employing one of system 400 or system 500) can acknowledge the received packet (e.g., via an acknowledgment LWIPEP packet generated by processor(s) 410 (or processor(s) 510), transmitted by transceiver circuitry 420 (or communication circuitry 520), received by communication circuitry 520 (or transceiver circuitry 420), and processed by processor(s) 510 (or processor(s) 410)).

Acknowledgment can be based on one of the following acknowledgment methods: (a) All packet(s) are acknowledged, (b) Every Nth packet is acknowledged, (c) Periodic acknowledgment, or (d) acknowledgment occurs in response to acknowledgment polling (e.g., via a polling flag set by the transmitting entity (e.g., at a UE employing system 400 or a BS employing system 500). The acknowledgment method can be configured by the BS (e.g., via higher layer (e.g., RRC) signaling generated by processor(s) 510, transmitted by communication circuitry 520, received by transceiver circuitry 420, and processed by processor(s) 410).

When an acknowledgment is to be sent (e.g., via transceiver circuitry 420 (or communication circuitry 520) as generated by processor(s) 410 (or processor(s) 510)), the receiving entity can set the A bit to "1" and set sequence number field with the SN of the last received LWIPEP packet.

If there is a gap in the received packet, one of the following alternatives can be employed (e.g., by processor(s) 410 or processor(s) 510 of the receiving entity): (a) Ignore the gap for the acknowledgment or (b) Start a timer and set the SN field with the SN of the last received packet LWIPEP packet before the gap. At timer expiry, optionally, the SN field can be set to the SN of the last received LWIPEP packet. Alternatively, in aspects, the last in-sequence received SN is not updated. Additionally, in aspects, at timer expiry, the receiving entity can build (e.g., via processor(s) 410 or processor(s) 510) a NACK to indicate the SN of the lost packet (in aspects, one of the "key" field bit or a flag bit can be used for this purpose). In various aspects, the timer can be configured by the BS (e.g., via higher layer (e.g., RRC) signaling generated by processor(s) 510, transmitted via communication circuitry 520, received via transceiver circuitry 420, and processed by processor(s) 410).

If data is received out of order, one of the following alternatives can be employed (e.g., by processor(s) 410 or processor(s) 510 of the receiving entity): (a) Ignore acknowledgment for received packet(s) that are not in sequence, for example, for every packet with SN less than latest received SN and outside the receiving window (the receiving entity can assume that the transmitting entity does not send more than half of the transmission window) or (b) Build a special NACK to indicate the SN of the packet(s) out of sequence (in aspects, one of the "key" field bit or a flag bit can be used for this purpose).

The acknowledgment message (e.g., generated by processor(s) 410 or processor(s) 510) can be sent (e.g., by transceiver circuitry 420 or communication circuitry 520) standalone (e.g., with only a GRE header and not data), or it can be sent along with UL (for a receiving entity employing system 400) or DL (for a receiving entity employing system 500) data.

Additionally, in aspects, the receiving entity can maintain (e.g., via processor(s) 410 or processor(s) 510) a receiving window. The receiving window can be moved when in-sequence data is received (e.g., via transceiver circuitry 420 or communication circuitry 520) or upon expiry of a timer. An acknowledgment (e.g., generated by processor(s) 410 or processor(s) 510) can be sent (e.g., by transceiver circuitry 420 or communication circuitry 520) each time the receiving window is moved (e.g., by processor(s) 410 or processor(s) 510). In addition, the receiving window can facilitate re-ordering (e.g., by processor(s) 410 or processor(s) 510) within one link, or between multiple links when the GRE tunnel is used for LWIP tunnel and for LTE.

Acknowledgment Upon Poll Request

In aspects, one bit of the GRE header can be repurposed for acknowledgment upon poll request. For example, acknowledgment upon poll request can employ one of the flag bits or one of the MSB (Most Significant Bits) of the "Key" field (the "Key" field can be used to provide the DRB (Data Radio Bearer) ID, but in various aspects, only the 5 LSBs (Least Significant Bits) are employed for this purpose, leaving some free bits available).

When the transmitting entity seeks an acknowledgment, it can set (e.g., via processor(s) 410 or processor(s) 510) the "poll" bit (e.g., the determined bit, which can be the flag bit, one of the MSBs of the "Key" field, etc.) in the GRE header before sending the LWIPEP packet.

The receiving entity, when detecting the poll bit (e.g., via processor(s) 410 or processor(s) 510), can provide (e.g., via processor(s) 410 or processor(s) 510) the SN of the last received LWIPEP packet in the acknowledgment number field.

UE Capability

UE capability signaling to support the above functionality can be defined in multiple ways. In some aspects, all Rel-14 LWIP-capable UEs can be assumed to support GRE acknowledgment and re-ordering. In other aspects, separate capability bits can be defined for re-ordering and acknowledgment (e.g., predefined in a specification or defined via higher layer signaling generated by processor(s) 510, transmitted via communication circuitry 520, received via transceiver circuitry 420, and processed by processor(s) 410).

Additional Embodiments

Figure 8:
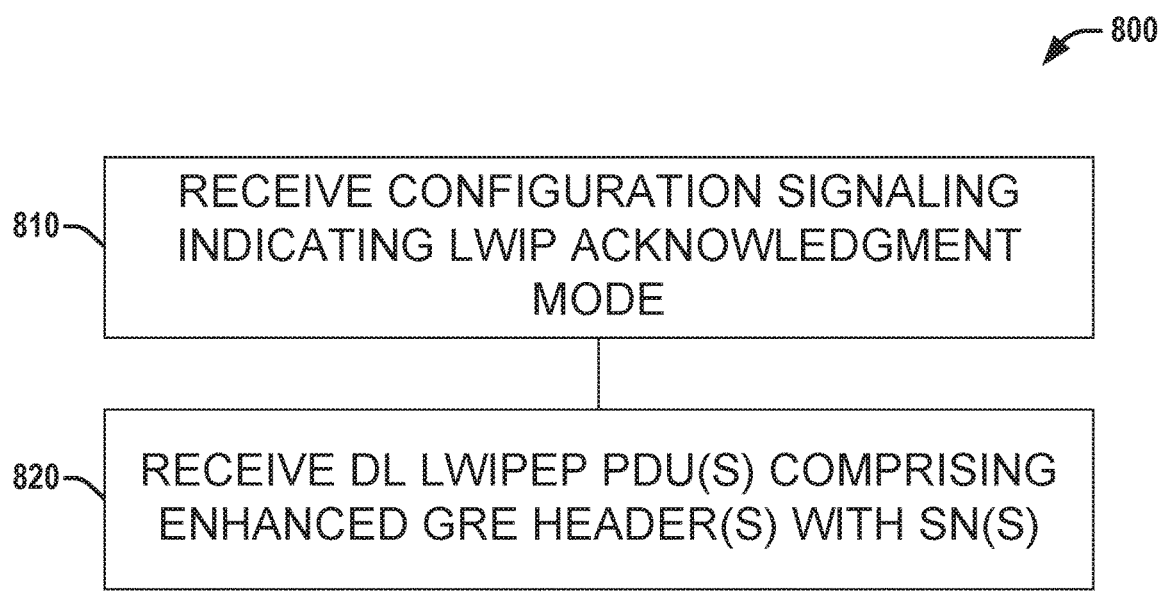
FIG. 8 is a flow diagram of an example method employable at a UE that facilitates DL communication of LWIPEP PDUs in connection with a LWIP acknowledgment mechanism, according to various aspects discussed herein.

Referring to FIG. 8, illustrated is a flow diagram of an example method 800 employable at a UE that facilitates DL communication of LWIPEP PDUs in connection with a LWIP acknowledgment mechanism, according to various aspects discussed herein. In other aspects, a machine readable medium can store instructions associated with method 800 that, when executed, can cause a UE to perform the acts of method 800.

At 810, configuration signaling indicating an LWIP acknowledgment mode can be received.

At 820, one or more DL LWIPEP PDUs can be received, each of which can comprise an enhanced GRE header that indicates a SN of a payload of that DL LWIPEP PDU.

Additionally or alternatively, method 800 can include one or more other acts described herein in connection with receiving entity aspects of system 400.

Figure 9:
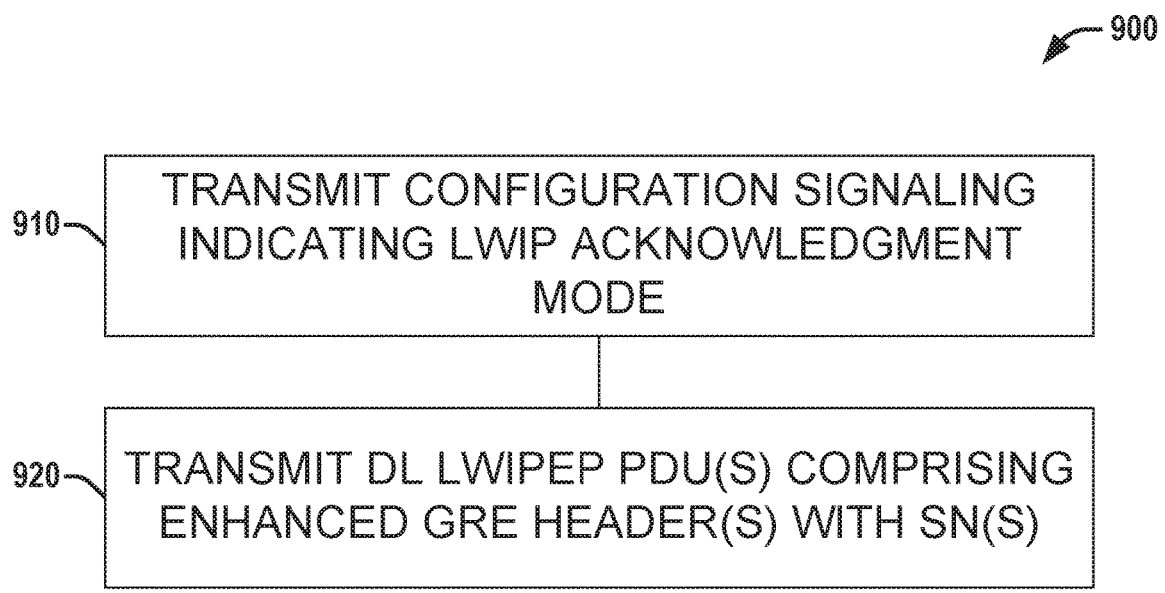
FIG. 9 is a flow diagram of an example method employable at a BS that facilitates DL communication of LWIPEP PDUs in connection with a LWIP acknowledgment mechanism, according to various aspects discussed herein.

Referring to FIG. 9, illustrated is a flow diagram of an example method 900 employable at a BS that facilitates DL communication of LWIPEP PDUs in connection with a LWIP acknowledgment mechanism, according to various aspects discussed herein. In other aspects, a machine readable medium can store instructions associated with method 900 that, when executed, can cause a BS (e.g., eNB, gNB, etc.) to perform the acts of method 900.

At 910, configuration signaling indicating an LWIP acknowledgment mode can be transmitted.

At 920, one or more DL LWIPEP PDUs can be transmitted, each of which can comprise an enhanced GRE header that indicates a SN of a payload of that DL LWIPEP PDU.

Additionally or alternatively, method 900 can include one or more other acts described herein in connection with transmitting entity aspects of system 500.

Figure 10:
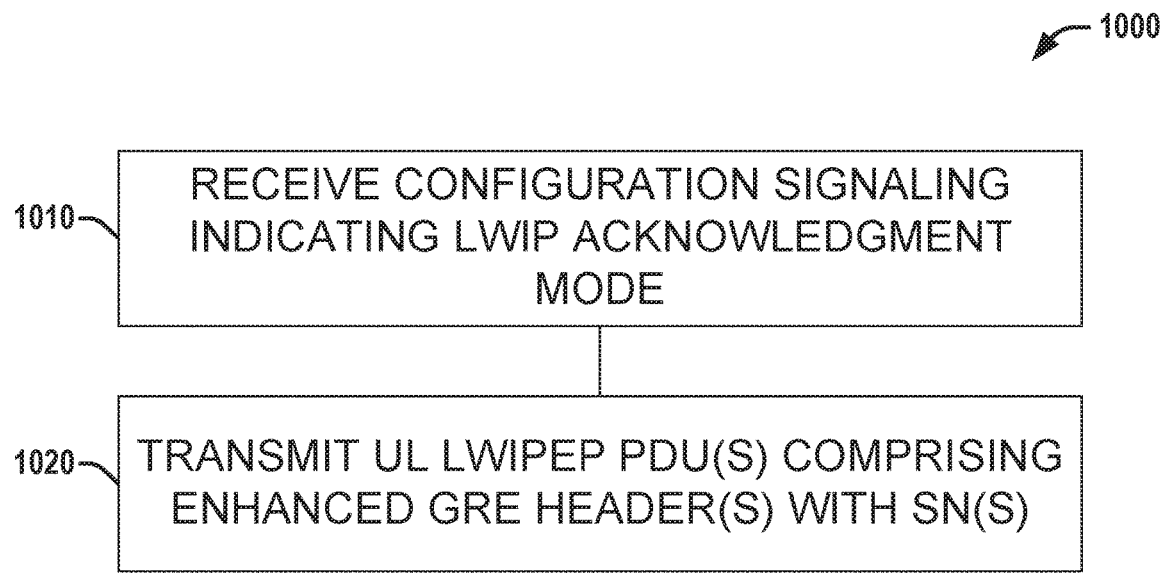
FIG. 10 is a flow diagram of an example method employable at a UE that facilitates UL communication of LWIPEP PDUs in connection with a LWIP acknowledgment mechanism, according to various aspects discussed herein.

Referring to FIG. 10, illustrated is a flow diagram of an example method 1000 employable at a UE that facilitates UL communication of LWIPEP PDUs in connection with a LWIP acknowledgment mechanism, according to various aspects discussed herein. In other aspects, a machine readable medium can store instructions associated with method 1000 that, when executed, can cause a UE to perform the acts of method 1000.

At 1010, configuration signaling indicating an LWIP acknowledgment mode can be received.

At 1020, one or more UL LWIPEP PDUs can be transmitted, each of which can comprise an enhanced GRE header that indicates a SN of a payload of that UL LWIPEP PDU.

Additionally or alternatively, method 1000 can include one or more other acts described herein in connection with transmitting entity aspects of system 400.

Figure 11:
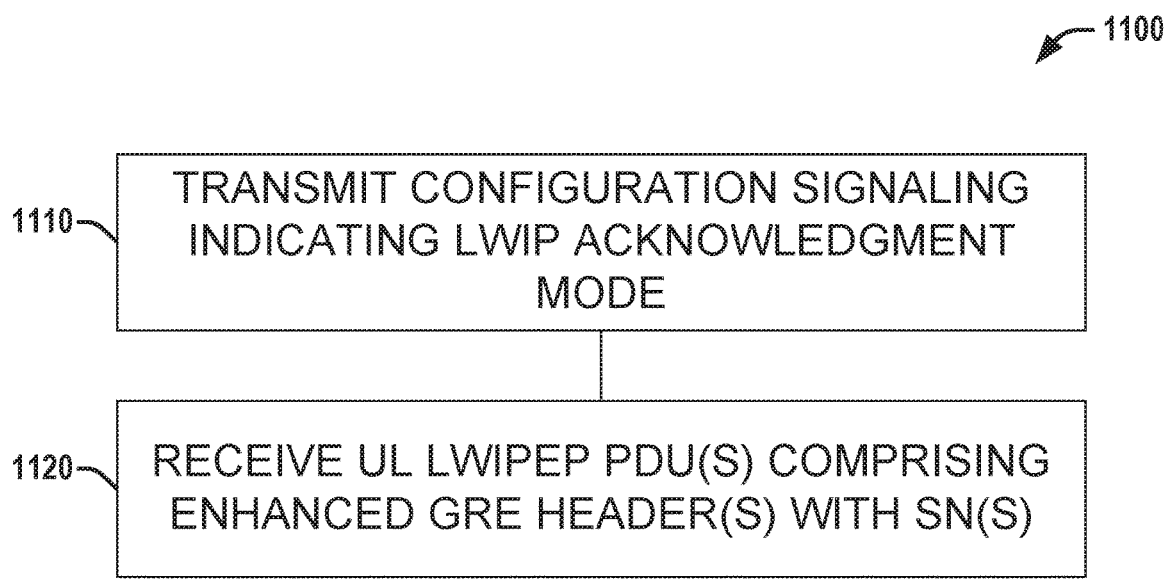
FIG. 11 is a flow diagram of an example method employable at a BS that facilitates UL communication of LWIPEP PDUs in connection with a LWIP acknowledgment mechanism, according to various aspects discussed herein.

Referring to FIG. 11, illustrated is a flow diagram of an example method 1100 employable at a BS that facilitates UL communication of LWIPEP PDUs in connection with a LWIP acknowledgment mechanism, according to various aspects discussed herein. In other aspects, a machine readable medium can store instructions associated with method 1100 that, when executed, can cause a BS (e.g., eNB, gNB, etc.) to perform the acts of method 1100.

At 1110, configuration signaling indicating an LWIP acknowledgment mode can be transmitted.

At 1120, one or more UL LWIPEP PDUs can be received, each of which can comprise an enhanced GRE header that indicates a SN of a payload of that UL LWIPEP PDU.

Additionally or alternatively, method 1100 can include one or more other acts described herein in connection with receiving entity aspects of system 500.

A first example embodiment employable in connection with aspects discussed herein can comprise a User Equipment (UE) supporting LWIP, comprising: cellular transceiver circuitry (e.g., as a portion of transceiver circuitry 420) configured to communicate via a cellular link, and WLAN transceiver circuitry (e.g., as a portion of transceiver circuitry 420) configured to communicate via a WLAN link.

In various aspects of the first example embodiment, the UE can be further configured to enable (e.g., via processor(s) 410) a LWIP acknowledgment mode in response to a request from a BS (e.g., generated by processor(s) 510, transmitted via communication circuitry 520, received via transceiver circuitry 420, and processed by processor(s) 410). In various such aspects, the UE can be further configured to send (e.g., via transceiver circuitry 420) an acknowledgment (e.g., generated by processor(s) 410) upon receiving an LWIPEP packet according to the configured acknowledgment mode. In various such aspects, the acknowledgment can be generated (e.g., via processor(s) 410) and sent (e.g., via as a standalone message or along with UL data. In various such aspects, the UE can be further configured to set (e.g., via processor(s) 410) a flag in the LWIPEP header to notify the BS of the presence of an acknowledgment in the LWIPEP packet and to set (e.g., via processor(s) 410) the sequence number of the acknowledged received LWIPEP packet in the LWIPEP header. In various such aspects, the acknowledged LWIPEP packet can be the last LWIPEP packet received in sequence. In various such aspects, the sequence number (SN) given in the acknowledged field can be the sequence number of the next expected packet following the acknowledged LWIEP packet. In various such aspects, the UE can be further configured to start (e.g., via processor(s) 410) a timer when a missing LWIPEP packet is detected (e.g., via processor(s) 410).

In various aspects of the first example embodiment, the UE can be further configured to send (e.g., via transceiver circuitry 420) an acknowledgment (e.g., generated by processor(s) 410) when the timer for the missing LWIPEP packet expired and the missing packet has not yet been received. In various such aspects, the sequence number given in the acknowledged field can be the sequence number of the last received in-sequence LWIPEP packet following the missing LWIPEP packet. In various such aspects, the UE can be configured to indicate (e.g., via the LWIPEP header as generated by processor(s) 410) to the BS the SN of the missing packet(s). In scenarios wherein multiple LWIPEP packets are missing, any of a variety of techniques used (e.g., a bitmap) to minimize the size of the acknowledgment (e.g., comprising one or more ACKs (acknowledgments)) LWIPEP ACK packet. In one example, a bitmap that can be employed in such scenarios can use the SN of the last received in-sequence packet as a reference packet, and each bit of the bitmap can correspond to a +1 increment of the reference SN. In such aspects, if bit is set to 1, it can indicate that the packet is received, while if a bit set to 0 packet, it can indicate that the packet is missing (or vice versa).

In various aspects of the first example embodiment, the UE can be further configured to indicate (e.g., via the LWIPEP header as generated by processor(s) 410) to the BS the SN of a LWIP packet received out of sequence.

In various aspects of the first example embodiment, the UE can be further configured to manage (e.g., via processor(s) 410) a receiving window to trigger LWIPEP packet acknowledgment and LWIEP packet reordering (e.g., by processor(s) 410). In various such aspects, the UE can be further configured to re-order (e.g., via processor(s) 410) LWIPEP packet(s) received on the WLAN link and/or LTE link based on the sequence number set in the LWIPEP header. In various such aspects, the UE can be further configured to send (e.g., via transceiver circuitry 420) an acknowledgment (e.g., generated by processor(s) 410) when the receiving windows is moved (e.g., by processor(s) 410).

In various aspects of the first example embodiment, the UE can be further configured to send (e.g., via transceiver 420) an acknowledgment (e.g., generated by processor(s) 410) in response to a polling request received (e.g., via transceiver circuitry 420) from the BS.

In various aspects of the first example embodiment, the UE can be further configured to notify the support of the GRE based acknowledgment to the BS (e.g., via an LWIPEP packet generated by processor(s) 410, transmitted via transceiver circuitry 420, received via communication circuitry 520, and processed by processor(s) 510).

A second example embodiment employable in connection with aspects discussed herein can comprise a BS (e.g., eNB, gNB, etc.) configured to signal to a UE an LWIP acknowledge mode (e.g., via configuration (e.g., higher layer (e.g., RRC)) signaling generated by processor(s) 510, transmitted via communication circuitry 520, received via transceiver circuitry 420, and processed by processor(s) 410).

In various aspects of the second example embodiment, the LWIP acknowledge mode is configured independently for UL and DL (e.g., via configuration (e.g., higher layer (e.g., RRC)) signaling generated by processor(s) 510, transmitted via communication circuitry 520, received via transceiver circuitry 420, and processed by processor(s) 410).

In various aspects of the second example embodiment, the LWIP acknowledge mode can define (e.g., via configuration (e.g., higher layer (e.g., RRC)) signaling generated by processor(s) 510, transmitted via communication circuitry 520, received via transceiver circuitry 420, and processed by processor(s) 410) one of a periodic acknowledgment reporting with a periodic time, acknowledgment based on a number of packet(s), or an acknowledgment upon poll request.

In various aspects of the second example embodiment, the BS can be further configured to set (e.g., via processor(s) 510) a polling flag (e.g., via a bit selected as discussed herein) in the LWIPEP header to request an acknowledgment. In similar aspects for a UE transmitting entity, the UE can set (e.g., via processor(s) 410) a polling flag (e.g., via a bit selected as discussed herein) in the LWIPEP header to request an acknowledgment.

In various aspects of the second example embodiment, the BS can be further configured to notify the UE of the presence of a sequence number in the LWIPEP header (e.g., via processor(s) 510 setting a value of an associated bit (e.g., the "S" bit as discussed herein)) and add (e.g., via processor(s) 510) a sequence number in the LWIPEP header of the LWIPEP packet (e.g., generated by processor(s) 510) sent to the UE (e.g., via communication circuitry 520).

In various aspects of the second example embodiment, the BS can be further configured to increment (e.g., via processor(s) 510) the sequence number of the LWIEP header for each LWIPEP packet (e.g., generated by processor(s) 510) sent (e.g., via communication circuitry 520) to the UE.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: process configuration signaling comprising an indication of a LWIP (LTE (Long Term Evolution)/WLAN (Wireless Local Area Network) Radio Level Integration Using IPSec (Internet Protocol Security) Tunnel) acknowledgment mode; process one or more DL (Downlink) LWIPEP (LWIP Encapsulation Protocol) PDUs (Protocol Data Units), wherein each of the one or more DL LWIPEP PDUs comprises an associated enhanced GRE (Generic Routing Encapsulation) header of that DL LWIPEP PDU that indicates an associated SN (Sequence Number) of an associated payload of that DL LWIPEP PDU; and send the indication of the LWIP acknowledgment mode to a memory via the memory interface.

Example 2 comprises the subject matter of any variation of any of example(s) 1, wherein the processing circuitry is further configured to generate, based on the LWIP acknowledgment mode, an acknowledgment LWIPEP PDU in response to at least one of the one or more DL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

Example 3 comprises the subject matter of any variation of any of example(s) 2, wherein the enhanced GRE header of the acknowledgment LWIPEP PDU comprises the associated SN of the associated payload of an acknowledged LWIPEP PDU of the one or more DL LWIPEP PDUs.

Example 4 comprises the subject matter of any variation of any of example(s) 3, wherein the acknowledged LWIPEP PDU is a most recent in-sequence LWIPEP PDU of the one or more DL LWIPEP PDUs.

Example 5 comprises the subject matter of any variation of any of example(s) 2, wherein the enhanced GRE header of the acknowledgment LWIPEP PDU comprises a SN of a next expected payload after the associated payload of a most recent in-sequence LWIPEP PDU of the one or more DL LWIPEP PDUs.

Example 6 comprises the subject matter of any variation of any of example(s) 2, wherein the processing circuitry is further configured to: detect one or more missing LWIPEP PDUs based on the associated SNs of the associated payloads of the one or more DL LWIPEP PDUs; and start a timer in response to the one or more missing LWIPEP PDUs being detected.

Example 7 comprises the subject matter of any variation of any of example(s) 6, wherein the processing circuitry is further configured to generate the acknowledgment LWIPEP PDU in response to an expiration of the timer.

Example 8 comprises the subject matter of any variation of any of example(s) 7, wherein the enhanced GRE header of the acknowledgment LWIPEP PDU comprises the associated SN of the associated payload of a most recent in-sequence LWIPEP PDU that follows a first missing LWIPEP PDU of the one or more missing LWIPEP PDUs.

Example 9 comprises the subject matter of any variation of any of example(s) 7, wherein the enhanced GRE header of the acknowledgment LWIPEP PDU comprises a SN associated with at least one of the one or more missing LWIPEP PDUs.

Example 10 comprises the subject matter of any variation of any of example(s) 2, wherein the acknowledgment LWIPEP comprises one of a standalone acknowledgment message or UL (Uplink) data.

Example 11 comprises the subject matter of any variation of any of example(s) 2, wherein the processing circuitry is configured to generate the acknowledgment LWIPEP PDU in response to a polling request.

Example 12 comprises the subject matter of any variation of any of example(s) 1-11, wherein the processing circuitry is further configured to manage a receiving window associated with the one or more DL LWIPEP PDUs.

Example 13 comprises the subject matter of any variation of any of example(s) 12, wherein the one or more DL LWIPEP PDUs comprise at least one of one or more LTE (Long Term Evolution) DL LWIPEP PDUs or one or more WiFi DL LWIPEP PDUs, and wherein the processing circuitry is further configured to re-order, based on the associated SNs of the associated payloads of the one or more DL LWIPEP PDUs, one or more of the one or more LTE DL LWIPEP PDUs or the one or more WiFi DL LWIPEP PDUs.

Example 14 comprises the subject matter of any variation of any of example(s) 12, wherein the processing circuitry is further configured to generate, in response to the receiving window being moved, an acknowledgment LWIPEP PDU in response to at least one of the one or more DL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

Example 15 comprises the subject matter of any variation of any of example(s) 1-11, wherein the processing circuitry is further configured to generate a notification that indicates support for the LWIP acknowledgment mode.

Example 16 comprises the subject matter of any variation of any of example(s) 2-5, wherein the processing circuitry is further configured to: detect one or more missing LWIPEP PDUs based on the associated SNs of the associated payloads of the one or more DL LWIPEP PDUs; and start a timer in response to the one or more missing LWIPEP PDUs being detected.

Example 17 comprises the subject matter of any variation of any of example(s) 2-9, wherein the acknowledgment LWIPEP comprises one of a standalone acknowledgment message or UL (Uplink) data.

Example 18 comprises the subject matter of any variation of any of example(s) 2-10, wherein the processing circuitry is configured to generate the acknowledgment LWIPEP PDU in response to a polling request.

Example 19 is an apparatus configured to be employed in a BS (Base Station), comprising: a memory interface; and processing circuitry configured to: generate configuration signaling comprising an indication of a LWIP (LTE (Long Term Evolution)/WLAN (Wireless Local Area Network) Radio Level Integration Using IPSec (Internet Protocol Security) Tunnel) acknowledgment mode; generate one or more DL (Downlink) LWIPEP (LWIP Encapsulation Protocol) PDUs (Protocol Data Units), wherein each of the one or more DL LWIPEP PDUs comprises an associated enhanced GRE (Generic Routing Encapsulation) header that indicates an associated SN (Sequence Number) of an associated payload of that DL LWIPEP PDU; and send the indication of the LWIP acknowledgment mode to a memory via the memory interface, wherein the BS is one of an eNB (Evolved NodeB) or a gNB (next Generation Node B).

Example 20 comprises the subject matter of any variation of any of example(s) 19, wherein the processing circuitry is further configured to generate additional configuration signaling comprising an indication of an additional LWIP acknowledgment mode, wherein the LWIP acknowledgment mode is associated with one of a DL or an UL (Uplink), and wherein the additional LWIP acknowledgment mode is associated with the other of the DL or the UL.

Example 21 comprises the subject matter of any variation of any of example(s) 19, wherein the LWIP acknowledgment mode defines one of: a periodic acknowledgment reporting based on a periodic time, an acknowledgment based on a number of packets, or an acknowledgment in response to a polling request.

Example 22 comprises the subject matter of any variation of any of example(s) 21, wherein the LWIP acknowledgment mode defines the acknowledgment in response to the polling request, and wherein the processing circuitry is further configured to indicate the polling request via a polling flag set in the associated enhanced GRE header of a first DL LWIPEP PDU of the one or more DL LWIPEP PDUs.

Example 23 comprises the subject matter of any variation of any of example(s) 19-22, wherein the processing circuitry is further configured to indicate, for each of the one or more DL LWIPEP PDUs, the presence of the associated SN in the associated enhanced GRE header of that DL LWIPEP PDU via setting an associated SN flag in that associated enhanced GRE header.

Example 24 comprises the subject matter of any variation of any of example(s) 19-22, wherein the processing circuitry is further configured to select the associated SN of the associated enhanced GRE header of each of the one or more DL LWIPEP PDUs to be incremented over a SN selected before that associated SN.

Example 25 is an apparatus configured to be employed in a UE (User Equipment), comprising: a memory interface; and processing circuitry configured to: process configuration signaling comprising an indication of a LWIP (LTE (Long Term Evolution)/WLAN (Wireless Local Area Network) Radio Level Integration Using IPSec (Internet Protocol Security) Tunnel) acknowledgment mode; generate one or more UL (Uplink) LWIPEP (LWIP Encapsulation Protocol) PDUs (Protocol Data Units), wherein each of the one or more UL LWIPEP PDUs comprises an associated enhanced GRE (Generic Routing Encapsulation) header that indicates an associated SN (Sequence Number) of an associated payload of that UL LWIPEP PDU; and send the indication of the LWIP acknowledgment mode to a memory via the memory interface.

Example 26 comprises the subject matter of any variation of any of example(s) 25, wherein the LWIP acknowledgment mode defines one of: a periodic acknowledgment reporting based on a periodic time, an acknowledgment based on a number of packets, or an acknowledgment in response to a polling request.

Example 27 comprises the subject matter of any variation of any of example(s) 25, wherein the processing circuitry is further configured to manage a transmitting window associated with the one or more UL LWIPEP PDUs.

Example 28 comprises the subject matter of any variation of any of example(s) 25-27, wherein the processing circuitry is further configured to indicate, for each of the one or more UL LWIPEP PDUs, the presence of the associated SN in the associated enhanced GRE header of that UL LWIPEP PDU via setting an associated SN flag in that associated enhanced GRE header.

Example 29 comprises the subject matter of any variation of any of example(s) 25-27, wherein the processing circuitry is further configured to process an acknowledgment LWIPEP PDU in response to at least one of the one or more UL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

Example 30 is an apparatus configured to be employed in a BS (Base Station), comprising: a memory interface; and processing circuitry configured to: generate configuration signaling comprising an indication of a LWIP (LTE (Long Term Evolution)/WLAN (Wireless Local Area Network) Radio Level Integration Using IPSec (Internet Protocol Security) Tunnel) acknowledgment mode; process one or more UL (Uplink) LWIPEP (LWIP Encapsulation Protocol) PDUs (Protocol Data Units), wherein each of the one or more UL LWIPEP PDUs comprises an associated enhanced GRE (Generic Routing Encapsulation) header that indicates an associated SN (Sequence Number) of an associated payload of that UL LWIPEP PDU; and send the indication of the LWIP acknowledgment mode to a memory via the memory interface, wherein the BS is one of an eNB (Evolved NodeB) or a gNB (next Generation Node B).

Example 31 comprises the subject matter of any variation of any of example(s) 30, wherein the processing circuitry is further configured to generate, based on the LWIP acknowledgment mode, an acknowledgment LWIPEP PDU in response to at least one of the one or more UL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

Example 32 comprises the subject matter of any variation of any of example(s) 30, wherein the processing circuitry is further configured to generate additional configuration signaling comprising an indication of an additional LWIP acknowledgment mode, wherein the LWIP acknowledgment mode is associated with one of a DL or an UL (Uplink), and wherein the additional LWIP acknowledgment mode is associated with the other of the DL or the UL.

Example 33 comprises the subject matter of any variation of any of example(s) 30-32, wherein the LWIP acknowledgment mode defines one of: a periodic acknowledgment reporting based on a periodic time, an acknowledgment based on a number of packets, or an acknowledgment in response to a polling request.

Example 34 comprises an apparatus comprising means for executing any of the described operations of examples 1-33.

Example 35 comprises a machine readable medium that stores instructions for execution by a processor to perform any of the described operations of examples 1-33.

Example 36 comprises an apparatus comprising: a memory interface; and processing circuitry configured to: perform any of the described operations of examples 1-33.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a UE (User Equipment), comprising
    processing circuitry configured to:
        process configuration signaling comprising an indication of a LWIP (LTE (Long Term Evolution)/WLAN (Wireless Local Area Network) Radio Level Integration Using IPSec (Internet Protocol Security) Tunnel) acknowledgment mode;
        process one or more DL (Downlink) LWIPEP (LWIP Encapsulation Protocol) PDUs (Protocol Data Units), wherein each of the one or more DL LWIPEP PDUs comprises an associated enhanced GRE (Generic Routing Encapsulation) header of that DL LWIPEP PDU that indicates an associated SN (Sequence Number) of an associated payload of that DL LWIPEP PDU; and
        generate, based on the LWIP acknowledgment mode, an acknowledgment LWIPEP PDU in response to at least one of the one or more DL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

2. The apparatus of claim 1, wherein the enhanced GRE header of the acknowledgment LWIPEP PDU comprises the associated SN of the associated payload of an acknowledged LWIPEP PDU of the one or more DL LWIPEP PDUs.

3. The apparatus of claim 2, wherein the acknowledged LWIPEP PDU is a most recent in-sequence LWIPEP PDU of the one or more DL LWIPEP PDUs.

4. The apparatus of claim 1, wherein the enhanced GRE header of the acknowledgment LWIPEP PDU comprises a SN of a next expected payload after the associated payload of a most recent in-sequence LWIPEP PDU of the one or more DL LWIPEP PDUs.

5. The apparatus of claim 1, wherein the processing circuitry is further configured to:
    detect one or more missing LWIPEP PDUs based on the associated SNs of the associated payloads of the one or more DL LWIPEP PDUs; and start a timer in response to the one or more missing LWIPEP PDUs being detected.

6. The apparatus of claim 5, wherein the processing circuitry is further configured to generate the acknowledgment LWIPEP PDU in response to an expiration of the timer.

7. The apparatus of claim 6, wherein the enhanced GRE header of the acknowledgment LWIPEP PDU comprises the associated SN of the associated payload of a most recent in-sequence LWIPEP PDU that follows a first missing LWIPEP PDU of the one or more missing LWIPEP PDUs.

8. The apparatus of claim 6, wherein the enhanced GRE header of the acknowledgment LWIPEP PDU comprises a SN associated with at least one of the one or more missing LWIPEP PDUs.

9. The apparatus of claim 1, wherein the acknowledgment LWIPEP comprises one of a standalone acknowledgment message or UL (Uplink) data.

10. The apparatus of claim 1, wherein the processing circuitry is configured to generate the acknowledgment LWIPEP PDU in response to a polling request.

11. The apparatus of claim 1, wherein the processing circuitry is further configured to manage a receiving window associated with the one or more DL LWIPEP PDUs.

12. The apparatus of claim 11, wherein the one or more DL LWIPEP PDUs comprise at least one of one or more LTE (Long Term Evolution) DL LWIPEP PDUs or one or more WiFi DL LWIPEP PDUs, and wherein the processing circuitry is further configured to re-order, based on the associated SNs of the associated payloads of the one or more DL LWIPEP PDUs, one or more of the one or more LTE DL LWIPEP PDUs or the one or more WiFi DL LWIPEP PDUs.

13. The apparatus of claim 11, wherein the processing circuitry is further configured to generate, in response to the receiving window being moved, an acknowledgment LWIPEP PDU in response to at least one of the one or more DL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

14. The apparatus of claim 1, wherein the processing circuitry is further configured to generate a notification that indicates support for the LWIP acknowledgment mode.

15. An apparatus configured to be employed in a BS (Base Station), comprising
processing circuitry configured to:
generate configuration signaling comprising an indication of a LWIP (LTE (Long Term Evolution)/WLAN (Wireless Local Area Network) Radio Level Integration Using IPSec (Internet Protocol Security) Tunnel) acknowledgment mode;
generate one or more DL (Downlink) LWIPEP (LWIP Encapsulation Protocol) PDUs (Protocol Data Units), wherein each of the one or more DL LWIPEP PDUs comprises an associated enhanced GRE (Generic Routing Encapsulation) header that indicates an associated SN (Sequence Number) of an associated payload of that DL LWIPEP PDU; and
process an acknowledgment LWIPEP PDU associated with at least one of the one or more DL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

16. The apparatus of claim 15, wherein the processing circuitry is further configured to generate additional configuration signaling comprising an indication of an additional LWIP acknowledgment mode, wherein the LWIP acknowledgment mode is associated with one of a DL or an UL (Uplink), and wherein the additional LWIP acknowledgment mode is associated with the other of the DL or the UL.

17. The apparatus of claim 15, wherein the LWIP acknowledgment mode defines one of: a periodic acknowledgment reporting based on a periodic time, an acknowledgment based on a number of packets, or an acknowledgment in response to a polling request.

18. The apparatus of claim 17, wherein the LWIP acknowledgment mode defines the acknowledgment in response to the polling request, and wherein the processing circuitry is further configured to indicate the polling request via a polling flag set in the associated enhanced GRE header of a first DL LWIPEP PDU of the one or more DL LWIPEP PDUs.

19. The apparatus of claim 15, wherein the processing circuitry is further configured to indicate, for each of the one or more DL LWIPEP PDUs, the presence of the associated SN in the associated enhanced GRE header of that DL LWIPEP PDU via setting an associated SN flag in that associated enhanced GRE header.

20. The apparatus of claim 15, wherein the processing circuitry is further configured to select the associated SN of the associated enhanced GRE header of each of the one or more DL LWIPEP PDUs to be incremented over a SN selected before that associated SN.

21. An apparatus configured to be employed in a UE (User Equipment), comprising
processing circuitry configured to:
process configuration signaling comprising an indication of a LWIP (LTE (Long Term Evolution)/WLAN (Wireless Local Area Network) Radio Level Integration Using IPSec (Internet Protocol Security) Tunnel) acknowledgment mode;
generate one or more UL (Uplink) LWIPEP (LWIP Encapsulation Protocol) PDUs (Protocol Data Units), wherein each of the one or more UL LWIPEP PDUs comprises an associated enhanced GRE (Generic Routing Encapsulation) header that indicates an associated SN (Sequence Number) of an associated payload of that UL LWIPEP PDU; and
process, based on the LWIP acknowledgment mode, an acknowledgment LWIPEP PDU associated with at least one of the one or more UL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

22. The apparatus of claim 21, wherein the LWIP acknowledgment mode defines one of: a periodic acknowledgment reporting based on a periodic time, an acknowledgment based on a number of packets, or an acknowledgment in response to a polling request.

23. The apparatus of claim 21, wherein the processing circuitry is further configured to manage a transmitting window associated with the one or more UL LWIPEP PDUs.

24. The apparatus of claim 21, wherein the processing circuitry is further configured to indicate, for each of the one or more UL LWIPEP PDUs, the presence of the associated SN in the associated enhanced GRE header of that UL LWIPEP PDU via setting an associated SN flag in that associated enhanced GRE header.

25. The apparatus of claim 21, wherein the processing circuitry is further configured to process an acknowledgment LWIPEP PDU in response to at least one of the one or more UL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

26. An apparatus configured to be employed in a BS (Base Station), comprising
processing circuitry configured to:
generate configuration signaling comprising an indication of a LWIP (LTE (Long Term Evolution)/WLAN (Wireless Local Area Network) Radio Level Integration Using IPSec (Internet Protocol Security) Tunnel) acknowledgment mode;
process one or more UL (Uplink) LWIPEP (LWIP Encapsulation Protocol) PDUs (Protocol Data Units), wherein each of the one or more UL LWIPEP PDUs comprises an associated enhanced GRE (Generic Routing Encapsulation) header that indicates an associated SN (Sequence Number) of an associated payload of that UL LWIPEP PDU; and
generate, based on the LWIP acknowledgment mode, an acknowledgment LWIPEP PDU in response to at least one of the one or more UL LWIPEP PDUs, wherein the acknowledgment LWIPEP PDU comprises an enhanced GRE header of the acknowledgment LWIPEP PDU, and wherein the enhanced GRE header of the acknowledgment LWIPEP PDU comprises an acknowledgment flag that indicates the presence of an acknowledgment in the acknowledgment LWIPEP PDU.

27. The apparatus of claim 26, wherein the processing circuitry is further configured to generate additional configuration signaling comprising an indication of an additional LWIP acknowledgment mode, wherein the LWIP acknowledgment mode is associated with one of a DL or an UL (Uplink), and wherein the additional LWIP acknowledgment mode is associated with the other of the DL or the UL.

28. The apparatus of claim 26, wherein the LWIP acknowledgment mode defines one of: a periodic acknowledgment reporting based on a periodic time, an acknowledgment based on a number of packets, or an acknowledgment in response to a polling request.

* * * * *